United States Patent
Braun et al.

(10) Patent No.: US 11,190,121 B2
(45) Date of Patent: Nov. 30, 2021

(54) METHOD FOR CONTROLLING A SYNCHRONOUS MACHINE AND CONTROL DEVICE FOR A SYNCHRONOUS MACHINE

(71) Applicant: Robert Bosch GmbH, Stuttgart (DE)

(72) Inventors: Martin Braun, Neustetten-Wolfenhausen (DE); Holger Rapp, Ditzingen (DE); Stefan Kurz, Frankfurt (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/325,790

(22) PCT Filed: Aug. 1, 2017

(86) PCT No.: PCT/EP2017/069378
§ 371 (c)(1),
(2) Date: Feb. 15, 2019

(87) PCT Pub. No.: WO2018/033378
PCT Pub. Date: Feb. 22, 2018

(65) Prior Publication Data
US 2019/0207546 A1  Jul. 4, 2019

(30) Foreign Application Priority Data

Aug. 18, 2016 (DE) .................. 10 2016 211 474.3

(51) Int. Cl.
*H02P 6/10* (2006.01)
*H02P 21/22* (2016.01)
(Continued)

(52) U.S. Cl.
CPC ............. *H02P 21/22* (2016.02); *H02P 21/06* (2013.01); *H02P 21/10* (2013.01); *H02P 21/16* (2016.02);
(Continued)

(58) Field of Classification Search
CPC .......... H02P 21/22; H02P 21/06; H02P 21/10; H02P 21/16; H02P 2205/01; H02P 2207/05
(Continued)

(56) References Cited

U.S. PATENT DOCUMENTS

| | | | |
|---|---|---|---|
| 5,719,482 A * | 2/1998 | Kunzel | .................. H02P 21/06 318/798 |
| 2011/0241586 A1 * | 10/2011 | Tobari | ..................... H02P 21/06 318/400.23 |
| 2017/0250631 A1 * | 8/2017 | Lamsahel | ................ H02P 6/16 |

FOREIGN PATENT DOCUMENTS

| | | |
|---|---|---|
| DE | 4209305 | 9/1993 |
| WO | 2010043454 | 4/2010 |

OTHER PUBLICATIONS

Marek Lazor, Marek Stulrajter, Modified Field Oriented Control for Smooth Torque Operation of a BLDC motor; May 19-20, 2014, IEEE, pp. 180-185 (Year: 2014).*

(Continued)

*Primary Examiner* — Kawing Chan
*Assistant Examiner* — Zemenay T Truneh
(74) *Attorney, Agent, or Firm* — Michael Best & Friedrich LLP (57) ABSTRACT

The present invention provides control of a synchronous machine with non-sinusoidal current-voltage profiles. The synchronous machine is controlled in a field-oriented coordinate system. In this case, the transformation between field-oriented coordinate system and stator-oriented coordinate system is effected by specific, adapted transformations which take account of the non-sinusoidal signal profiles during the driving of the synchronous machine, such that the latter correspond to current-voltage profiles progressing in a constant fashion in the field-oriented coordinate system. What is achieved thereby is that the non-sinusoidal current- (Continued)

voltage profiles need not be taken into account in any way in the design of the control system in the field-oriented coordinate system.

15 Claims, 5 Drawing Sheets

(51) Int. Cl.
*H02P 21/06* (2016.01)
*H02P 21/10* (2016.01)
*H02P 21/16* (2016.01)

(52) U.S. Cl.
CPC ...... *H02P 2205/01* (2013.01); *H02P 2207/05* (2013.01)

(58) Field of Classification Search
USPC .............................................. 318/700, 400.23
See application file for complete search history.

(56) References Cited

OTHER PUBLICATIONS

International Search Report for Application No. PCT/EP2017/069378 dated Dec. 12, 2017 (English Translation, 2 pages).

* cited by examiner

METHOD FOR CONTROLLING A SYNCHRONOUS MACHINE AND CONTROL DEVICE FOR A SYNCHRONOUS MACHINE

BACKGROUND OF THE INVENTION

The present invention relates to a method for closed-loop control of a synchronous machine and a closed-loop control apparatus for a synchronous machine.

Document WO 2010043454 A1 has disclosed a method and apparatus for field-oriented closed-loop control of a synchronous machine. A setpoint value for the quadrature-axis component of current, a setpoint value for the direct-axis component of current, an actual value for the quadrature-axis component of current and an actual value of the direct-axis component of current are established in the process. Here, the quadrature-axis component of current serves to form the torque of the machine while the direct-axis component of current serves to form the field or attenuate the field. These values are supplied to a controller, which establishes a quadrature-axis component of voltage and a direct-axis component of voltage. These are converted into voltages of a polyphase three-phase voltage system and then transmitted to a pulse-controlled inverter. Conversely, the stator currents of the machine are detected and converted into the actual values of the direct-axis component and quadrature-axis component of current with knowledge of the rotor position angle or the rotor angle. Closed-loop control of the synchronous machine is implemented by way of the output signals of the pulse-controlled inverter.

As a rule, converter-fed synchronous machines are operated by sinusoidal currents, independently of the form of their voltage induced by the excitation field. A voltage feedforward control for introducing these sinusoidal currents, too, is implemented in sinusoidal fashion in this case. Deviations from the sinusoidal form of the voltage induced by the excitation field can lead to disturbances in the current curve. By way of example, these can be compensated by a disturbance observer. In this way, a virtually sinusoidal current curve is impressed onto the synchronous machine.

SUMMARY OF THE INVENTION

The present invention discloses a method for closed-loop control of a synchronous machine and a closed-loop control apparatus for a synchronous machine.

Accordingly, the following is provided:

A method for closed-loop control of a synchronous machine, including the steps of detecting a measured value of a controlled variable of the synchronous machine in a stator-oriented coordinate system and transforming the detected measured value from the stator-oriented coordinate system into a field-oriented coordinate system. The method further comprises the steps of calculating a manipulated variable for actuating the synchronous machine in the field-oriented coordinate system, transforming the calculated manipulated variable from the field-oriented coordinate system into the stator-oriented coordinate system and actuating the synchronous machine on the basis of the manipulated variable transformed into the stator-oriented coordinate system. Here, the transformation of the calculated manipulated variable from the field-oriented coordinate system into the stator-oriented coordinate system comprises a transformation into a curve of the manipulated variable that is non-sinusoidal in relation to the electric rotor angle of the synchronous machine in the stator-oriented coordinate system. In particular, the function of the manipulated variable depending on the rotor angle of the synchronous machine in the stator-oriented coordinate system is a non-sinusoidal function. Similarly, the curve of the controlled variable to be set as a function of the rotor angle is a non-sinusoidal function.

Further, the following is provided:

A closed-loop control apparatus for a synchronous machine, comprising a measuring device, a first transformation device, a computing device, a second transformation device and an actuation device. The measuring device is designed to capture a controlled variable of the synchronous machine. The first transformation device is designed to transform the detected controlled variable of the synchronous machine from a stator-oriented coordinate system into a field-oriented coordinate system. The computing device is designed to calculate a manipulated variable for the synchronous machine using the controlled variable that was transformed into the field-oriented coordinate system and using a predetermined threshold value. The second transformation device is designed to transform the calculated manipulated variable from the field-oriented coordinate system into a stator-oriented coordinate system. Here, the curve of the transformed manipulated variable with respect to the rotor angle of the synchronous machine has a non-sinusoidal curve in the stator-oriented coordinate system. In particular, the transformed manipulated variable in the stator-oriented coordinate system as a function of the rotor angle of the synchronous machine is a non-sinusoidal function. Similarly, the curve of the controlled variable to be set as a function of the rotor angle is a non-sinusoidal function. The actuation device is designed to actuate the synchronous machine using the non-sinusoidal manipulated variable that was transformed into the stator-oriented coordinate system.

Furthermore, the following is provided:

An electric drive system comprising a synchronous machine and a closed-loop control apparatus according to the invention.

The present invention is based on the discovery that there are variations in the torque of the synchronous machine in the case of an interaction between a non-sinusoidal induced voltage in a synchronous machine and a feed of sinusoidal currents into the synchronous machine. In particular, the torque may vary as a function of the rotor angle of the synchronous machine. This may lead to jerkiness of the synchronous machine in the case of low rotational speeds of the motor. Unwanted noise generation may set in as a result thereof at higher rotational speeds. However, feeding non-sinusoidal currents into a synchronous machine represents a non-negligible challenge. Particularly if the calculation of controlled variables of the synchronous machine is carried out in a field-oriented coordinate system, the transformations between stator-oriented coordinate system and field-oriented coordinate system are based on sinusoidal signal curves in conventional systems. The transformation equations based on this are also referred to as the "Park transform".

The basic concept of field-oriented closed-loop control consists of controlled variables with a sinusoidal curve in the steady-state becoming zero-frequency variables as a result of the transformation thereof into the field-oriented coordinate system. Furthermore, the basic concept consists of the manipulated variables in the field-oriented coordinate system, which are zero-frequency variables in the steady-state, becoming sinusoidal periodic variables with the desired amplitude, frequency and phase angle by way of their transformation into the stator-oriented coordinate system. As a result, the reference frequency response of the controller only has to cover the range from the frequency 0 to a low limit frequency.

However, should the curve of the controlled variables that is desired in the steady-state be non-sinusoidal, these controlled variables would not become zero-frequency variables as a result of the transformation into the field-oriented coordinate system but would instead become zero-frequency variables with superposed alternating components, with the spectrum of these alternating components comprising 6-times the stator base frequency and odd multiples thereof. Thus, depending on the rotational speed of the motor, this may relate to very high frequency alternating components. Since these alternating components are desired in this case, they would have to be modulated onto the field-oriented setpoint variables and the controller would have to master a frequency range from 0 to far above 6-times the maximum stator frequency. This would undo the advantage of closed-loop control in field-oriented coordinates.

Likewise, field-oriented zero-frequency manipulated variables will be converted into sinusoidal manipulated variables in the case of a transformation into the stator-oriented coordinate system. In order to obtain the desired non-sinusoidal curves of the manipulated variables, high frequency alternating components would have to be superposed onto the field-oriented manipulated variables, said high-frequency alternating components having 6-times the stator frequency as a base frequency. This also counteracts the greatest advantage of closed-loop control in the field-oriented coordinate system, namely that controlled and manipulated variables only have a zero-frequency component but no alternating components in the steady-state.

Nevertheless, this procedure is known and also finds application. A solution based on the modulation of high-frequency alternating components is described in, for example, Lazor, M.; Stulrajter, M.: "Modified Field Oriented Control for Smooth Torque Operation of a BLDC Motor", Conference proceedings of IEEE Elektro 2014, May 19-20, 2014, Rakecke Teplice (SK), p. 180-185, ISBN 978-1-4799-3720-2.

Therefore, the present invention is based on the concept of accounting for this discovery and providing closed-loop control for a synchronous machine, which permits a simple and efficient feed of non-sinusoidal currents into the synchronous machine using a field-oriented calculation of the controlled variables. To this end, the present invention provides for an adaptation of the transformation between stator-oriented coordinate system and field-oriented coordinate system, wherein the desired curves of the controlled variables are converted into pure zero-frequency variables as a result of the transformation into the field-oriented coordinate system and field-oriented manipulated variables which are predetermined as constants are converted into the desired, non-sinusoidal curve by the transformation.

This allows complicated modulating of alternating components onto the field-oriented variables to be dispensed with and the closed-loop control structure and the controller dynamics in the field-oriented coordinate system can remain completely unchanged in relation to a conventional field-oriented closed-loop control system. When designing the controller itself, the non-sinusoidal form of the desired controlled variables and the required manipulated variables need not be taken into account at all.

By adapting the transformation equations between the field-oriented coordinate system and stator-oriented coordinate system, an adapted curve of this manipulated variable in the stator-oriented coordinate system can be generated from an easily calculated manipulated variable, said curve allowing an optimized actuation of the synchronous machine. In particular, this can easily provide a suitable current/voltage curve in the stator-oriented coordinate system, which facilitates a virtually constant operation over the entire rotor angle range. In this way, it is possible to provide a virtually constant torque, for example over the entire rotor angle range, and hence facilitate a jerk-free and low-noise operation. Further, operation with virtually constant power input, for example, is also possible over the entire rotor angle range. Moreover, the adaptation and tuning to further parameters is likewise possible.

According to one embodiment, the manipulated variable comprises a non-sinusoidal current curve and/or a non-sinusoidal voltage curve in the stator-oriented coordinate system. In particular, the transformation of the manipulated variable from the field-oriented coordinate system into the stator-oriented coordinate system can convert zero-frequency variables into non-sinusoidal curves for the direct-axis component of voltage and quadrature-axis component of voltage or the direct-axis component of current and quadrature-axis component of current. In this way, the manipulated variables calculated in the field-oriented coordinate system can easily be calculated as zero-frequency variables and, subsequently, a non-sinusoidal manipulated variable curve, in particular, can be provided from these field-oriented zero-frequency variables in the stator-oriented coordinate system, on the basis of which an optimized actuation of the synchronous machine can be implemented.

According to a further embodiment, the desired curve of the controlled variable in the stator-oriented coordinate system has a non-sinusoidal curve in respect of the rotor angle of the synchronous machine. According to the invention, the controlled variable with this non-sinusoidal curve is converted into zero-frequency variables without noteworthy superposed alternating components by way of the transformation into the field-oriented coordinate system. In this way, non-sinusoidal controlled variables, too, can be processed and set particularly easily by a closed-loop control system operating in the field-oriented coordinate system.

According to a further embodiment, the method for closed-loop control of the synchronous machine comprises a step for establishing an induced voltage curve of the synchronous machine rotating in the idle state. In particular, the induced voltage curve is established as a function of the rotor angle of the synchronous machine. On the basis of the established induced voltage curve of the synchronous machine, the step for calculating the manipulated variable for actuating the synchronous machine can calculate the manipulated variable using the established induced voltage curve. In this way, an adaptation of the actuation of the synchronous machine for an optimized operation with a virtually constant torque, a constant power input or further parameters is possible, particularly in the case of non-sinusoidal induced voltage curves.

According to one embodiment, the closed-loop control apparatus comprises a memory device. The memory device is designed to save transformation values for a transformation between the stator-oriented coordinate system and the field-oriented coordinate system. In this case, the first transformation device and/or the second transformation device can carry out the transformation using the saved transformation values. In this way, a particularly simple transformation can be performed between values in the field-oriented coordinate system and non-sinusoidal functions in the stator-oriented coordinate system.

The expressions of controlled variables and manipulated variables, as used in the description, are usually polyphase variables which, according to the prior art, are describable by vectors relating to different coordinate systems. Here, this description uses the terms "manipulated variable" and "controlled variable" synonymously for both the individual components of the respective vectors and for the vectors as a whole.

In the entire description, the term "rotor angle" is always used within the meaning of "electric rotor angle" for the purposes of an improved understanding.

To the extent that this is sensible, the aforementioned configurations and developments can be combined with one another as desired. Further configurations, developments and implementations of the invention comprise combinations of features of the invention, described above or below in relation to the example embodiments, even if they have not been explicitly mentioned. In particular, a person skilled in the art will also add individual aspects as improvements or complements to the respective basic forms of the invention in this case.

BRIEF DESCRIPTION OF THE DRAWINGS

The present invention is explained in more detail below on the basis of the exemplary embodiments specified in the schematic figures of the drawings. In the figures.

DETAILED DESCRIPTION

Figure 1:
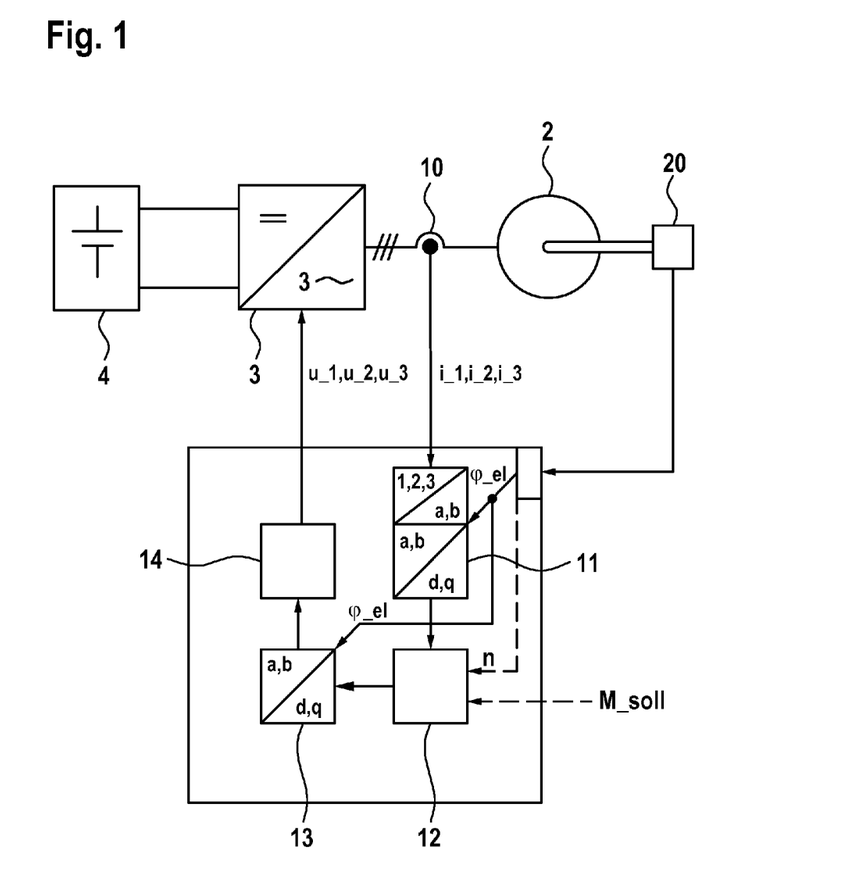
FIG. 1 shows a schematic illustration of an electrical drive system with a closed-loop control apparatus according to one embodiment.

FIG. 1 shows a schematic illustration of an electrical drive system having a closed-loop control apparatus 1 for a synchronous machine 2 according to one embodiment. In addition to the closed-loop control apparatus 1 and the synchronous machine 2, the electrical drive system comprises a converter 3 which, in accordance with its actuation, converts an input voltage of the converter 3 into an output voltage and which provides the output voltage of the converter 3 at the synchronous machine 2. Here, the converter 2 is fed by an electrical energy source 4, for example a battery. In particular, the battery in this case may comprise a traction battery of an electric or hybrid vehicle, for example. By way of example, the electrical drive system, as presented herein and described below, can be used as a drive system of an electric or hybrid vehicle. Moreover, the electrical drive system can also be used, however, in any further field of application and it is not restricted to the application in an electric or hybrid vehicle. By way of example, the synchronous machine 2 can be a three-phase synchronous machine. Moreover, synchronous machines with a number of phases that deviates from three are also possible, however. For the purposes of actuating the synchronous machine 2, the converter 3 can be fed both by a DC voltage source and by an AC voltage source.

The closed-loop control apparatus 1 for the synchronous machine 2 receives measured values from voltage and/or current sensors 10, which detect the voltages at the synchronous machine 2 and/or the currents applied to the synchronous machine 2, and a signal from a rotor position encoder 20, which provides an output signal corresponding to the rotor angle $\varphi\_el$ of the synchronous machine 2. On the basis of these values, the closed-loop control device 1 can determine a manipulated variable for the synchronous machine 2 in accordance with a predetermined setpoint value M, for example a torque to be set or a power intake to be set, and optional further parameters. In particular, the closed-loop control apparatus 1 can calculate the voltages to be set at the synchronous machine 2 by the converter 3 or the currents to be introduced into the synchronous machine 2, and can control the converter 3 accordingly.

Figure 2A:
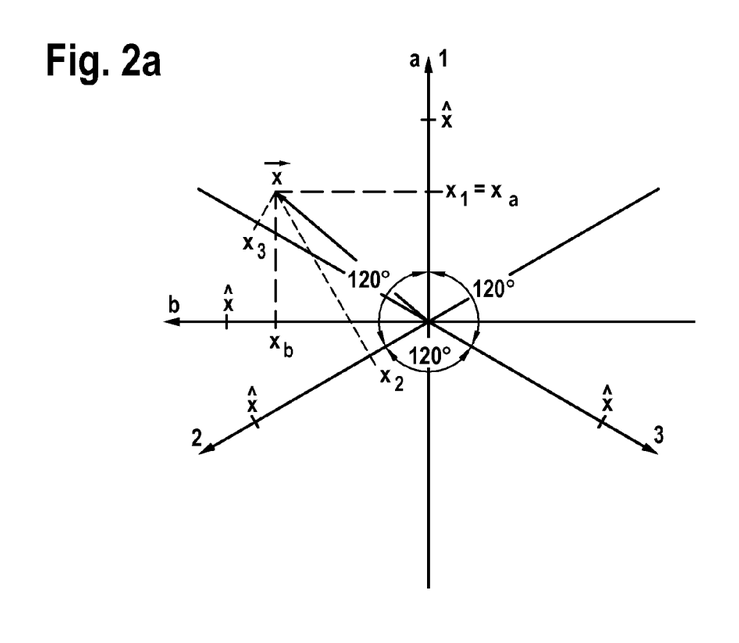
FIGS. 2a,b show a representation of a three-phase phasor diagram with the axes 1, 2 and 3 of the associated orthogonal coordinate system with the axes a=1 and b, and with the field-oriented coordinate system with the direct axis d and the quadrature axis q, said field-oriented coordinate system rotating with the rotor and therefore being rotated by the rotor angle $\varphi\_el$.

For the purposes of detecting the controlled variables, the controlled variables, for example current values and/or voltage values in the individual phases of the synchronous machine 2, can be detected by means of suitable sensors 10. Since the components of an, e.g., three-phase electrical variable, such as current or voltage, always yield zero when summed, these can be illustrated in a phasor diagram in a plane. This phasor diagram is illustrated in FIG. 2a. It has a number of axes that corresponds to the phase number m, said axes each being rotated through 360 degrees/m in relation to one another. Thus, in the example with three phases illustrated here, these axes are each offset by 120 degrees in relation to one another. Each current value combination of a three-phase variable system can be illustrated by a vector (phasor) in the plane. The three components of this vector, which are established by projecting the vector on the respective axis, always have the sum of 0. Consequently, a sinusoidal, three-phase current system can be represented by a vector of constant amplitude circulating with a constant angular speed. The same vector can also be uniquely described using only the two components on the axes a and b of the orthogonal coordinate system. It is known the following relationships exist between the three-phase variables $x\_1$, $x\_2$, $x\_3$ with $x\_1+x\_2+x\_3=0$ and the vector components $x\_a$ and $x\_b$ of the orthogonal, stator-oriented coordinate system with the axes a and b:

$x\_a = x\_1$ and $x\_b = (x\_1 + 2 \cdot x\_2)/\sqrt{3}$ and conversely:

$$x\_1 = x\_a,$$

$$x\_2 = (-x\_a + \sqrt{3} \cdot x\_b)/2 \text{ and}$$

$$x\_3 = (x\_a + \sqrt{3} \cdot x\_b)/2.$$

Figure 2B:
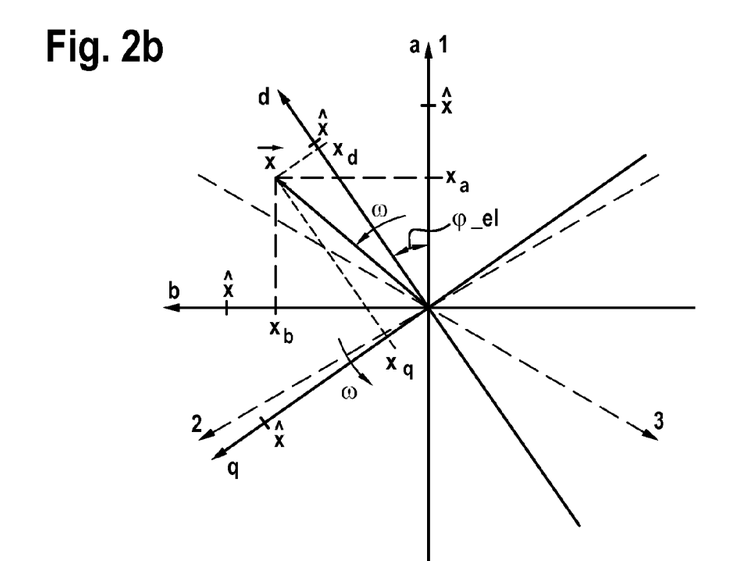

Finally, in the likewise orthogonal, field-oriented coordinate system, the axes d and q thereof are rotated through the rotor angle φ_el in relation to the stator-oriented axes a and b. This field-oriented coordinate system is illustrated in FIG. 2b.

It was found to be expedient to carry out the calculation in this field-oriented coordinate system to calculate the manipulated variables for the synchronous machine 2, in particular for actuating the converter 3 that feeds the synchronous machine 2. For sinusoidal signal curves of both the manipulated variable and the controlled variable, such a transformation between the stator-oriented coordinate system, in which the synchronous machine is operated, and the field-oriented coordinate system, in which the manipulated variables are calculated, is known as a "Park transform". Here, constant field-oriented voltage setpoint values for a direct-axis component of voltage u_d and a quadrature-axis component of voltage u_q are converted into sinusoidal voltage setpoint values u_a and u_b in a stator-oriented coordinate system. Then, these voltage setpoint values u_a and u_b in the stator-oriented coordinate system still can be converted into polyphase variables, for example into three voltages u_1, u_2 and u_3 of a three-phase system that are phase shifted by 120° in each case, and then fed to the converter 3 as manipulated variables. For a polyphase variable x, the equations of the Park transform for the transformation from the field-oriented into the stator-oriented coordinate system are as follows:

$$x\_a = x\_d^* \cos(\varphi\_el) - x\_q^* \sin(\varphi\_el) \text{ and}$$

$$x\_b = x\_d^* \sin(\varphi\_el) + x\_q^* \cos(\varphi\_el).$$

Conversely, the following applies to the transformation from the stator-oriented into the field-oriented coordinate system:

$$x\_d = x\_a^* \cos(\varphi\_el) + x\_b^* \sin(\varphi\_el) \text{ and}$$

$$x\_q = -x\_a^* \sin(\varphi\_el) + x\_b^* \cos(\varphi\_el).$$

If the measured values detected by the voltage/current sensors 10 do not have a sinusoidal curve in relation to the rotor angle of the synchronous machine 2, the measured values, after this conventional transformation such as a Park transform, for example, from the stator-oriented coordinate system into a field-oriented coordinate system, will additionally have one or more higher-frequency frequency components in addition to the zero-frequency component. The base frequency of these higher-frequency frequency components is six times the stator frequency. Consequently, it can vary greatly depending on the rotational speed of the synchronous machine and can also assume very high values of several kilohertz in the process. If a non-sinusoidal curve of the measured variables is desired in the stator-oriented coordinate system, this could, in theory, be achieved by virtue of the associated, rotational-speed-dependent high-frequency periodic components being modulated onto the setpoint values for these measured variables in the field-oriented coordinate system. However, since this high-frequency range normally cannot be covered by a controller, this nevertheless leads to only a sinusoidal curve of the measured values being impressed in reality. Only the region of very low rotational speeds, where the frequency of these periodic components is very low, would be excluded therefrom. In order to counteract this phenomenon, the transformation between the stator-oriented coordinate system and the field-oriented coordinate system can be adapted according to the invention. By way of example, a controlled variable of the synchronous machine 2 detected by a current or voltage sensor 10 can be provided to a measuring device, which thereupon detects the measured values of the current or voltage sensors (e.g., measured values of the currents i_1, i_2, i_3), calculates a controlled variable in the stator-oriented (a,b)-coordinate system therefrom (e.g., as i_a and i_b) and provides the latter to a first transformation device 11. Following this, this first transformation device 11 can transform the detected controlled variable in suitable fashion into a field-oriented coordinate system, in such a way that a desired, non-sinusoidal curve of the controlled variable in the stator-oriented coordinate system with axes a and b is transformed into pure zero-frequency variables in the field-oriented coordinate system with the axes d and q. Here, this transformation can take account of a known, non-sinusoidal curve of the controlled variable, in particular. By way of example, a transformation of stator-oriented currents i_a and i_b into the field-oriented coordinate system with the coordinates d and q can be carried out according to the following equations:

$$i\_d = (i\_a \cdot i\_q, b0(\varphi\_el) - i\_b \cdot i\_q, a0(\varphi\_el))/N(\varphi),$$

$$i\_q = (i\_b \cdot i\_d, a0(\varphi\_el) - i\_a \cdot i\_d, b0(\varphi\_el))/N(\varphi), \text{ with}$$

$$N(\varphi) = i\_d, a0(\varphi\_el) \cdot i\_q, b0(\varphi\_el) - i\_d, b0(\varphi\_el) \cdot i\_q, a0(\varphi\_el).$$

Here, i_q,a0(φ_el) and i_q,b0(φ_el) are the desired curves of the normalized quadrature-axis components of current, and i_d,a0(φ_el) and i_d,b0(φ_el) are the desired curves of the normalized direct-axis components of current in stator-oriented coordinate system. This ensures that the controlled variables in the field-oriented coordinate system in the steady-state are treated as pure zero-frequency variables precisely when the curve thereof in the stator-oriented coordinate system exactly corresponds to the desired curve.

The conversion of the detected three-phase measured variables x_1, x_2 and x_3 into the components x_a and x_b of the associated vector in the stator-oriented coordinate system and the subsequent transformation according to the invention into the field-oriented coordinate system can also be combined and carried out in one computational step.

After the detected controlled variables of the synchronous machine 2, in particular the stator-oriented actual currents, as are impressed into the synchronous machine, have been transformed into a field-oriented coordinate system by the first transformation device 11, a setpoint value for a manipulated variable of the synchronous machine can subsequently be calculated in a computing device 12. By way of example, calculating the setpoint value for actuating the synchronous machine can resort to any method, possibly an already known method, in this case. Thus, for example, a setpoint value M_soll for the torque of the synchronous machine can be fed back to the computing device. Setpoint values for the controlled variables in the field-oriented coordinate system can be determined internally from this setpoint value and, possibly, further measured values such as the rotational speed of the synchronous machine 2. Then, the computing device can thereupon calculate the setpoint values for the manipulated variable in the field-oriented coordinate system from these setpoint and actual values of the controlled variable, and possibly from additional information such as the rotational speed of the synchronous machine, for example. As a result of the preceding, adapted transformation of the actual values from the stator-oriented coordinate system into the field-oriented coordinate system, actual values with a pure zero-frequency component are present in the steady-state in the field-oriented coordinate system if the actual values in the stator-oriented coordinate system exactly have the desired, non-sinusoidal curves. As a result, calculating the manipulated variable for the actuation variable of the synchronous machine can be carried out particularly easily in a manner known per se. The computing device 12 need not take account of the desired non-sinusoidal curves of the controlled and/or manipulated variables in any way and can be implemented in exactly the same way as known for systems with sinusoidal curves of the controlled and manipulated variables.

After the calculation of the manipulated variable in the field-oriented coordinate system for actuating the synchronous machine 2 has been carried out in the computing device 12, the calculated manipulated variable, for example a direct-axis component of voltage curve u_d and a quadrature-axis component of voltage curve u_q can be transformed back from the field-oriented coordinate system into the stator-oriented coordinate system by the second transformation device 13. Here, too, there can be an adaptation of the transformation between the field-oriented (d,q)-coordinate system and the stator-oriented (a,b)-coordinate system.

By way of example, using the normalized direct-axis component of voltage curves u_d,a0($\varphi$_el) and u_d,b0($\varphi$_el) and the normalized quadrature-axis component of voltage curves u_q,a0($\varphi$_el) and u_q,b0($\varphi$_el), which are adapted to the desired non-sinusoidal curve, the adapted transformation in the second transformation device 13 can be carried out as follows:

$$u\_a = u\_d \cdot u\_d,a0(\varphi\_el) + u\_q \cdot u\_q,a0(\varphi\_el),$$

$$u\_b = u\_d \cdot u\_d,b0(\varphi\_el) + u\_q \cdot u\_q,b0(\varphi\_el).$$

This ensures that, in the stator-oriented coordinate system, the manipulated variables in the steady-state, i.e., when they are present as pure zero-frequency variables in the field-oriented coordinate system, exactly have the desired curve over the rotor angle $\varphi$_el. Additional modulation of the manipulated variables is not necessary, neither in the field-oriented nor in the stator-oriented coordinate system. Overall, as a result of the embodiment of the transformations according to the invention, the system leads exactly to the desired, non-sinusoidal curves of the currents and voltages of the synchronous machine 2, without having to undertake modifications on the actual closed-loop control system, the computing device 12, which operates on the basis of the field-oriented coordinate system. Consequently, the actual closed-loop control system operates independently of the current and voltage curves to be impressed. These desired current and voltage curves are set exclusively by the prescriptions i_d,a0($\varphi$_el), i_d,b0($\varphi$_el), i_q,a0($\varphi$_el) and i_q,b0($\varphi$_el) in the transformation device 11 and u_d,a0($\varphi$_el), u_d,b0($\varphi$_el), u_q,a0($\varphi$_el) and u_q,b0($\varphi$_el) in the transformation device 13.

Then, the synchronous machine 2 can be actuated on the basis of the manipulated variables in the form of setpoint values, for example for the direct-axis components of voltage and the quadrature-axis components of voltage, transformed from the field-oriented coordinate system into the stator-oriented coordinate system. To this end, the manipulated variables now present in stator-oriented coordinates, for example the voltage curves u_a and u_b, or u_1, u_2 and u_3, are converted by the control electronics of the converter 3 into actuation pulses at the circuit breaker thereof in a manner known per se, such that precisely these voltages also set-in at the output terminals of the converter 3. Here, it is particularly advantageous if the following relationship applies between the normalized quadrature-axis component of current curves and the normalized direct-axis component of voltage curves:

$$u\_d,a0(\varphi\_el) \sim (d\ i\_q,a0(\varphi\_el))/d\varphi\_el \text{ and}$$

$$u\_d,b0(\varphi\_el) \sim (d\ i\_q,b0(\varphi\_el))/d\varphi\_el$$

and if, moreover, the following relationship applies between the normalized direct-axis component of current curves and the normalized quadrature-axis component of voltage curves:

$$u\_q,a0(\varphi\_el) \sim (d\ i\_d,a0(\varphi\_el))/d\varphi\_el \text{ and}$$

$$u\_q,b0(\varphi\_el) \sim (d\ i\_d,b0(\varphi\_el))/d\varphi\_el.$$

Expressed differently, it is particularly advantageous if the normalized direct-axis component of voltage curve dependent on rotor angle $\varphi$_el of the synchronous machine 2 has a curve proportional to the gradient of the quadrature-axis component of current curve with respect to the rotor angle $\varphi$_el and the normalized quadrature-axis component of voltage curve is proportional to the change in the direct-axis component of current curve in relation to the rotor angle $\varphi$_el of the synchronous machine.

For the purposes of an efficient transformation between the field-oriented coordinate system and the stator-oriented coordinate system, the normalized current curves and the normalized voltage curves can be stored in a memory device of the closed-loop control apparatus 1, for example in the form of a lookup table or the like. In particular, the normalized voltage and current curves can be stored as a function of the rotor angle $\varphi$_el.

The transformation according to the invention from the field-oriented coordinate system with the axes d and q into the stator-oriented coordinate system with the axes a and b and the subsequent conversion of this result into the values of the three-phase phasor diagram with axes 1, 2 and 3 can also be carried out in one computational step.

Figure 3:
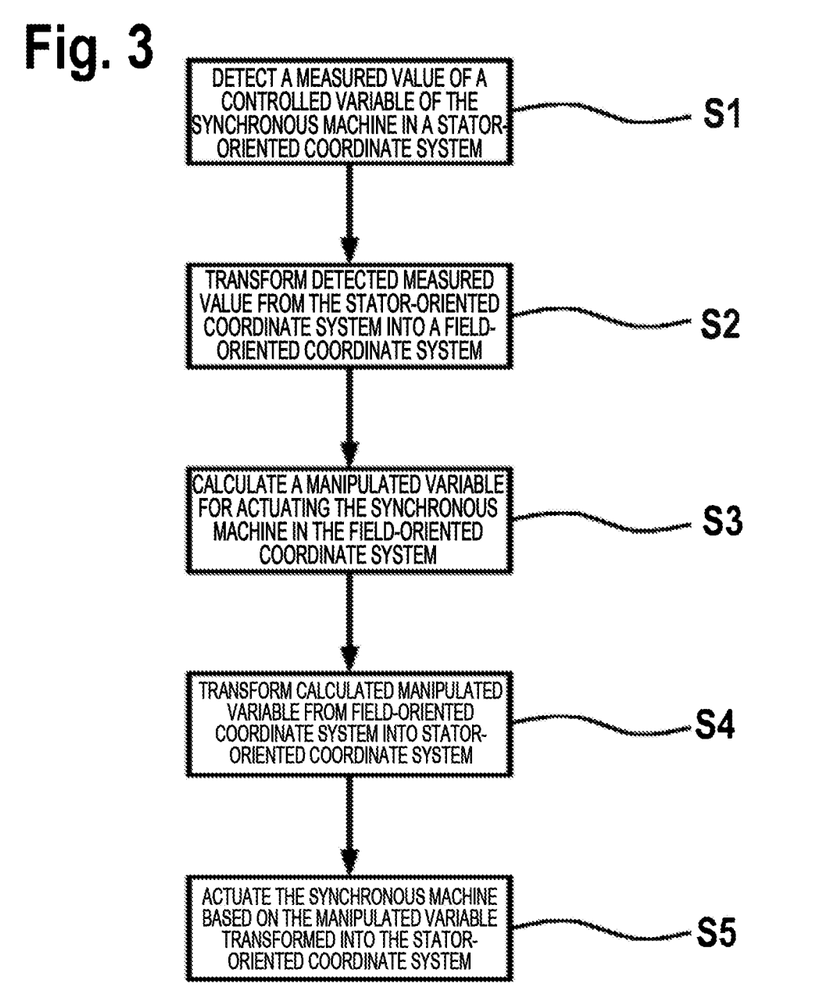
FIG. 3 shows a schematic illustration of a flowchart, as forms the basis of a method for closed-loop control of a synchronous machine according to one embodiment.

FIG. 3 shows a schematic illustration of a flowchart, as forms a basis of a method for closed-loop control of a synchronous machine 2 according to one embodiment. Initially, measured values of a controlled variable of the synchronous machine 2 are detected in step S1 in the stator-oriented coordinate system. To this end, it is possible, for example, to measure actual current values in individual phases of the synchronous machine 2 and calculate and provide the actual current values in a stator-oriented (a,b)-coordinate system on the basis of these measured values in a manner known per se. Thereupon, a transformation of the measured values captured in the stator-oriented coordinate system into a field-oriented (d,q)-coordinate system is implemented in step S2. Here it is possible, in particular, to take account of non-sinusoidal signal curves of the detected measured values and the transformation equations of the measured values from the stator-oriented coordinate system into the field-oriented coordinate system can be adapted according to this desired, non-sinusoidal signal curve.

A manipulated variable for activating the synchronous machine 2 is calculated in the field-oriented coordinate system in step S3. Subsequently, the calculated manipulated variable is transformed from the field-oriented coordinate system into the stator-oriented coordinate system in step S4. This transformation of the calculated manipulated variable from the field-oriented coordinate system to the stator-oriented coordinate system is also implemented with adapted transformation equations, which take account of the non-sinusoidal signal curve.

Thereupon, the converter 3 is actuated, and hence the manipulated variables are impressed at the stator connectors of the synchronous machine 2, in step S5 on the basis of the manipulated variables transformed from the field-oriented coordinate system into the stator-oriented coordinate system.

The transformation between the stator-oriented coordinate system and the field-oriented coordinate system can be adapted to any non-sinusoidal signal curve, in particular to signal curves that are dependent on the rotor angle φ_el of the synchronous machine 2. By way of example, the transformation between the stator-oriented coordinate system and the field-oriented coordinate system can be adapted to a trapezoidal signal curve.

Optionally, the non-sinusoidal signal curve can be limited to a predetermined number of harmonics in respect of a base frequency of the signal curve. By way of example, the signal curve may contain harmonics up to the, at most, fifth, seventh, eleventh or thirteenth harmonic, while higher-order harmonics are not contained or greatly damped in terms of their amplitude. Further options for modifying the signal curve therebeyond are, naturally, likewise possible.

For a specific example embodiment, FIGS. 4 to 7 show signal curves of the normalized direct-axis and quadrature-axis components of current in the stator-oriented coordinate system, which should be impressed on a synchronous machine, and the normalized direct-axis and quadrature-axis components of voltage that should be applied, preferably to the stator terminals of the synchronous machine 2, for impressing these current curves, in each case as a function of the rotor angle φ_el.

Figure 4:
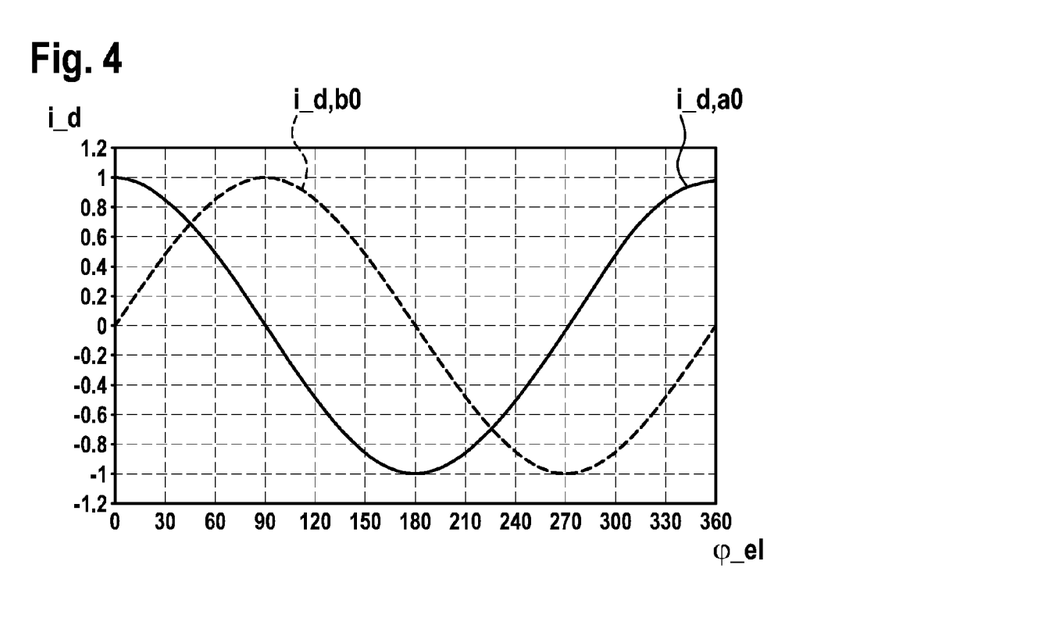
FIG. 4 plots a representation of a normalized curve of the stator currents $i\_d,a0(\varphi\_el)$ and $i\_d,b0(\varphi\_el)$ in the orthogonal coordinate system (a,b) against the rotor angle, which lead to a constant field-oriented actual value of the direct-axis component of current $i\_d$ and to a field-oriented actual value of the quadrature-axis component of current $i\_q=0$.

Here, FIG. 4 shows the curves of the normalized direct-axis components of current i_d,a0(φ_el) and i_d,b0(φ_el), which should be impressed on the synchronous machine by the field-oriented closed-loop control system in the steady state. In this exemplary embodiment, these are proportional to the curves of the magnetic stator flux linkage in the case of a deenergized stator winding as a function of the rotor angle φ_el. Thus, they arise directly from the structure of the machine in this case, in particular from the arrangement of the permanent magnets in the rotor and the embodiment of the stator winding.

Figure 5:
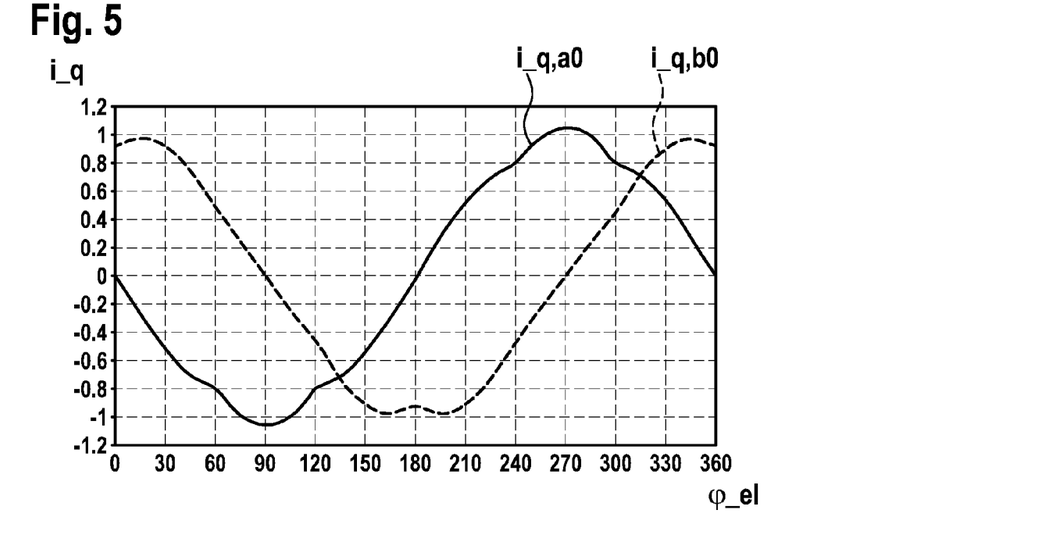
FIG. 5 plots a representation of a curve of the stator currents $i\_q,a0(\varphi\_el)$ and $i\_q,b0(\varphi\_el)$ in the orthogonal coordinate system (a,b) against the rotor angle, which lead to a constant field-oriented actual value of the quadrature-axis component of current $i\_q$ and to a field-oriented actual value of the direct-axis component of current $i\_d=0$.

FIG. 5 shows the curves of the normalized quadrature-axis components of current i_q,a0(φ_el) and i_q,b0(φ_el), which should be impressed on the synchronous machine by the field-oriented closed-loop control system in the steady state. In this exemplary embodiment, these are chosen in such a way that they cause a torque in the rotor that is independent of the rotor angle φ_el, i.e., a constant torque, in conjunction with the field of the permanent magnets.

Figure 6:
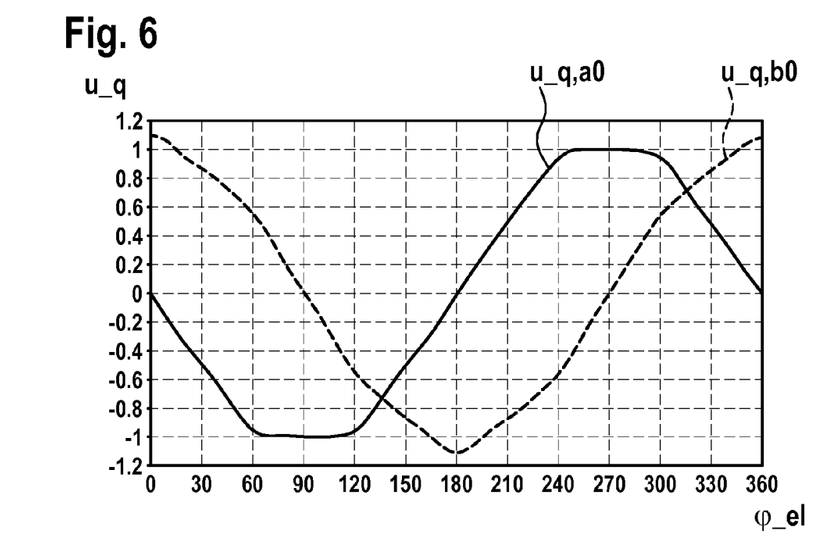
FIG. 6 plots a representation of a normalized curve of the quadrature-axis components of voltage $u\_q,a0(\varphi\_el)$ and $u\_q,b0(\varphi\_el)$ to be set in the case of a constant field-oriented setpoint value $u\_q$ in the orthogonal coordinate system (a,b) against the rotor angle.

FIG. 6 shows the curves of the normalized quadrature-axis components of voltage u_q,a0(φ_el) and u_q,b0(φ_el), which should be impressed on the synchronous machine by the field-oriented closed-loop control system in the steady state, i.e., in the case of a constant field-oriented voltage value u_q. In this exemplary embodiment, these are chosen in such a way that they lead to a direct-axis component of current curve corresponding to the normalized current curve plotted in FIG. 4. Hence, they are also proportional to the voltages that, in the case of the synchronous machine 2 rotating in the deenergized state, are induced by the magnetic field of the permanent magnets in the rotor in the stator winding thereof.

Figure 7:
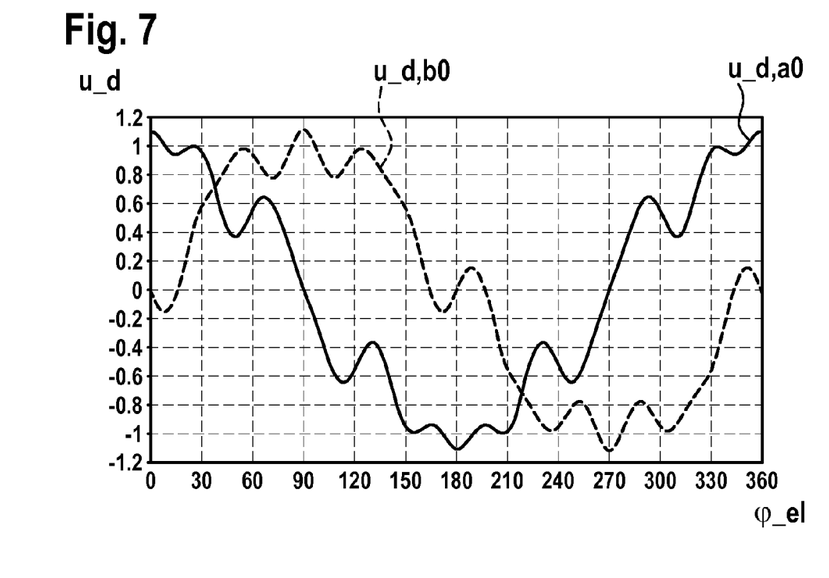
FIG. 7 plots a representation of a normalized curve of the direct-axis components of voltage $u\_d,a0(\varphi\_el)$ and $u\_d,b0(\varphi\_el)$ to be set in the case of a constant field-oriented setpoint value $u\_d$ in the orthogonal coordinate system (a,b) against the rotor angle.

FIG. 7 shows the curves of the normalized direct-axis components of voltage u_d,a0(φ_el) and u_d,b0(φ_el), which should be impressed on the synchronous machine by the field-oriented closed-loop control system in the steady state, i.e., in the case of a constant field-oriented voltage value u_d. In this exemplary embodiment, these are chosen in such a way that they lead to a quadrature-axis component of current curve corresponding to the normalized current curve plotted in FIG. 5.

In one embodiment of the invention, the signal curves i_d,a0(φ_el); i_d,b0(φ_el), i_q,a0(φ_el); i_q,b0(φ_el); u_d,a0(φ_el); u_d,b0(φ_el); u_q,a0(φ_el) and u_q,b0(φ_el) are predetermined in unchanging fashion over the service life of the synchronous machine or of the closed-loop control system.

In a further embodiment of the invention, the signal curves i_d,a0(φ_el); i_d,b0(φ_el), i_q,a0(φ_el); i_q,b0 (φ_el); u_d,a0(φ_el); u_d,b0(φ_el); u_q,a0(φ_el) and u_q,b0(φ_el) can be predetermined in varying fashion over the service life of the synchronous machine, optionally also as a function of ambient parameters such as a temperature, for example. In particular, the curve of the voltage induced in the stator winding of the synchronous machine rotating in deenergized fashion can be measured repeatedly over the service life and/or in the case of changing ambient parameters and, should there be a change, the aforementioned signal curves can be adapted to this changed curve of the induced voltage.

In a further preferred embodiment of the invention, the signal curves i_d,a0(φ_el); i_d,b0(φ_el), i_q,a0(φ_el); i_q,b0(φ_el); u_d,a0(φ_el); u_d,b0(φ_el); u_q,a0(φ_el) and u_q,b0(φ_el) can be varied depending on the operating point of the synchronous machine. In particular, if reluctance torque occurs in the synchronous machine, the signal forms can be adapted to the component of the reluctance torque M_R of the overall torque M=M_R+M S.

In one exemplary embodiment in this respect, the signal curves that lead to a constant synchronous torque M S that is independent of the rotor angle are denoted by i*_d,a0 (φ_el); i*_d,b0(φ_el), i*_q,a0(φ_el); i*_q,b0(φ_el); u*_d,a0(φ_el); u*_d,b0(φ_el); u*_q,a0(φ_el) and u*_q,b0(φ_el). By contrast, for a constant reluctance torque M_R, the normalized signal curve forms x_d,a0(φ_el)=x_q,b0(φ_el) =cos(φ_el); x_d,b0(φ_el)=sin(φ_el) and x_q,a0(φ_el)=−sin (φ_el) would be required. Here, the variable x is a placeholder for any electrical or magnetic variable, such as, e.g., current i, voltage u, magnetic flux linkage Y or current linkage Θ. Preferably, depending on the component of the reluctance torque in the overall torque of the synchronous machine, the normalized signal forms are now predetermined as:

$$x\_d,a0(\varphi\_el)=(M\_R \cdot \cos(\varphi\_el)+M\_S \cdot x\_d,a0^*(\varphi\_el))/(M\_R+M\_S);$$

$$x\_q,b0(\varphi\_el)=(M\_R \cdot \cos(\varphi\_el)+M\_S \cdot x\_q,b0^*(\varphi\_el))/(M\_R+M\_S);$$

$$x\_d,b0(\varphi\_el)=(M\_R \cdot \sin(\varphi\_el)+M\_S \cdot x\_d,b0^*(\varphi\_el))/(M\_R+M\_S);$$

$$x\_q,a0(\varphi\_el)=(-M\_R \cdot \sin(\varphi\_el)+M\_S \cdot x\_q,a0^*(\varphi\_el))/(M\_R+M\_S).$$

In conclusion, the present invention relates to closed-loop control of a synchronous machine with non-sinusoidal current-voltage curves. The closed-loop control of the synchronous machine is implemented in a field-oriented coordinate system. Here, the transformation between the field-oriented coordinate system and stator-oriented coordinate system is implemented by specific, adapted transformation equations, which take account of the non-sinusoidal signal curves when actuating the synchronous machine.

The invention claimed is:

1. A method for closed-loop control of a synchronous machine (2), the method comprising:
   detecting (S1) a measured value of a controlled variable of the synchronous machine (2) in a stator-oriented coordinate system;
   transforming (S2) the detected measured value from the stator-oriented coordinate system into a field-oriented coordinate system;
   calculating (S3) a manipulated variable for actuating the synchronous machine (2) in the field-oriented coordinate system;
   transforming (S4) the calculated manipulated variable from the field-oriented coordinate system into the stator-oriented coordinate system; and
   actuating (S5) the synchronous machine (2) on the basis of the manipulated variable transformed into the stator-oriented coordinate system,
   wherein the transformation of the calculated manipulated variable from the field-oriented coordinate system into the stator-oriented coordinate system comprises a transformation into a curve of the manipulated variable that is non-sinusoidal in relation to a rotor angle of the synchronous machine (2) in the stator-oriented coordinate system such that a non-sinusoidal function arises as a function of the manipulated variable based on the rotor angle of the synchronous machine in the stator-oriented coordinate system, and
   wherein a constant value x_d of the field-oriented direct-axis component of the manipulated variable leads to normalized curves x_d,a0($\varphi$_el) and x_d,b0($\varphi$_el) in the stator-oriented coordinate system and wherein a constant value x_q of the field-oriented quadrature-axis component of the manipulated variable leads to normalized curves x_q,a0($\varphi$_el) and x_q,b0($\varphi$_el) in the stator-oriented coordinate system and wherein the normalized curves x_d,a0($\varphi$_el), x_d,b0($\varphi$_el), x_q,a0($\varphi$_el) and x_q,b0($\varphi$_el) comprise at least one non-sinusoidal curve, and
   wherein the stator-oriented curves of the manipulated variables x_a and x_b are calculated from the field-oriented manipulated variables x_d and x_q according to the equations $$x\_a = x\_d \cdot x\_d, a0(\varphi\_el) + x\_q \cdot x\_q, a0(\varphi\_el) \text{ and}$$

$$x\_b = x\_d \cdot x\_d, b0(\varphi\_el) + x\_q \cdot x\_q, b0(\varphi\_el).$$

2. The method as claimed in claim 1, wherein the manipulated variable in the steady state comprises a non-sinusoidal current curve and/or a non-sinusoidal voltage curve in the stator-oriented coordinate system.

3. The method as claimed in claim 1, wherein the curve of the measured values of the controlled variable in the stator-oriented coordinate system have a non-sinusoidal curve in respect of the rotor angle of the synchronous machine (2) and wherein the step (S2) for transforming the measured value is adapted to transform the non-sinusoidal curve into a pure zero-frequency variable as a field-oriented controlled variable during the transformation into the field-oriented coordinate system.

4. The method as claimed in claim 1, wherein normalized curves y_d,a0($\varphi$_el) and y_d,b0($\varphi$_el) of the components of a controlled variable y in the stator-oriented coordinate system lead to a constant value y_d of the field-oriented direct-axis component of the controlled variable and to a constant value y_q=0 of the field-oriented quadrature-axis component of the controlled variable, and wherein normalized curves y_q,a0($\varphi$_el) and y_q,b0($\varphi$_el) of the components of a controlled variable y in the stator-oriented coordinate system lead to a constant value y_d=0 of the field-oriented direct-axis components of the controlled variable and to a constant value y_q of the field-oriented quadrature-axis component of the manipulated variables and wherein y_d,a0($\varphi$_el), y_d,b0($\varphi$_el), y_q,a0($\varphi$_el) and y_q,b0($\varphi$_el) comprise at least one non-sinusoidal curve.

5. The method as claimed in claim 4, wherein the field-oriented curves y_d, y_q of the manipulated variable are calculated from the stator-oriented components y_a and y_b of the controlled variable and from the normalized curves y_d,a0($\varphi$_el), y_d,b0($\varphi$_el), y_q,a0($\varphi$_el) and y_q,b0($\varphi$_el) of the controlled variable according to the equations $$y\_d = (y\_a \cdot y\_q, b0(\varphi\_el) - y\_b \cdot y\_q, a0(\varphi\_el)) / N(\varphi) \text{ and}$$

$$y\_q = (y\_b \cdot y\_d, a0(\varphi\_el) - y\_a \cdot y\_d, b0(\varphi\_el)) / N(\varphi),$$

and where $$N(\varphi) = y\_d, a0(\varphi\_el) \cdot y\_q, b0(\varphi\_el) - y\_d, b0(\varphi\_el) \cdot y\_q, a0(\varphi\_el).$$

6. The method as claimed in claim 4, wherein the normalized curves of the manipulated variable x_d,a0($\varphi$_el), x_d,b0($\varphi$_el), x_q,a0($\varphi$_el) and x_q,b0($\varphi$_el) and/or the normalized curves of the controlled variable y_d,a0($\varphi$_el), y_d,b0($\varphi$_el), y_q,a0($\varphi$_el) and y_q,b0($\varphi$_el) are predetermined.

7. The method as claimed in claim 4, wherein the normalized curves of the manipulated variable x_d,a0($\varphi$_el), x_d,b0($\varphi$_el), x_q,a0($\varphi$_el) and x_q,b0($\varphi$_el) and/or the normalized curves of the controlled variable y_d,a0($\varphi$_el), y_d,b0($\varphi$_el), y_q,a0($\varphi$_el) and y_q,b0($\varphi$_el) are adaptable as a function of ambient parameters.

8. The method as claimed in claim 4, wherein the normalized curves of the manipulated variable x_d,a0($\varphi$_el), x_d,b0($\varphi$_el), x_q,a0($\varphi$_el) and x_q,b0($\varphi$_el) and/or the normalized curves of the controlled variable y_d,a0($\varphi$_el), y_d,b0($\varphi$_el), y_q,a0($\varphi$_el) and y_q,b0($\varphi$_el) are adaptable as a function of the operating point of the synchronous machine (2).

9. The method as claimed in claim 8, wherein adapting the normalized curves of the manipulated variable x_d,a0($\varphi$_el), x_d,b0($\varphi$_el), x_q,a0($\varphi$_el) and x_q,b0($\varphi$_el) and/or the normalized curves of the controlled variable y_d,a0($\varphi$_el), y_d,b0($\varphi$_el), y_q,a0($\varphi$_el) and y_q,b0($\varphi$_el) is implemented as a function of the component of a reluctance torque of the overall torque of the synchronous machine (2).

10. The method as claimed in claim 1, including a step for establishing an induced voltage curve of the synchronous machine (2) rotating in the idle state as a function of the rotor angle of the synchronous machine (2), wherein step (S3) for calculating the manipulated variable for actuating the synchronous machine (2) calculates the manipulated variable using the established induced voltage curve and/or wherein step (S2) for calculating the controlled variable in the field-oriented coordinate system is calculated using the established induced voltage curve.

11. The method as claimed in claim 1, wherein the manipulated variable in the steady state comprises a non-sinusoidal current curve in the stator-oriented coordinate system.

12. The method as claimed in claim 1, wherein the manipulated variable in the steady state comprises a non-sinusoidal voltage curve in the stator-oriented coordinate system.

13. A closed-loop control apparatus (1) for a synchronous machine (2), comprising:
   a measuring device (10) configured to capture a controlled variable of the synchronous machine (2);
   a first transformation device (11) configured to transform the detected controlled variable of the synchronous machine (2) from a stator-oriented coordinate system into a field-oriented coordinate system,
   a computing device (12) configured to calculate a manipulated variable for the synchronous machine (2) using the controlled variable that was transformed into the field-oriented coordinate system and using a predetermined threshold;
   a second transformation device (13) configured to transform the calculated manipulated variable from a field-oriented coordinate system into a stator-oriented coordinate system, wherein the curve of the transformed manipulated variable with respect to the rotor angle of the synchronous machine (2) has a non-sinusoidal curve in the stator-oriented coordinate system such that a non-sinusoidal function arises as a function of the manipulated variable based on the rotor angle of the synchronous machine in the stator-oriented coordinate system;
   an actuation device (14) that is designed to actuate the synchronous machine (2) using the non-sinusoidal manipulated variable that was transformed into the stator-oriented coordinate system, wherein a constant value $x\_d$ of the field-oriented direct-axis component of the manipulated variable leads to normalized curves $x\_d, a0(\varphi\_el)$ and $x\_d, b0(\varphi\_el)$ in the stator-oriented coordinate system and wherein a constant value $x\_q$ of the field-oriented quadrature-axis component of the manipulated variable leads to normalized curves $x\_q, a0(\varphi\_el)$ and $x\_q, b0(\varphi\_el)$ in the stator-oriented coordinate system and wherein the normalized curves $x\_d, a0(\varphi\_el)$, $x\_d, b0(\varphi\_el)$, $x\_q, a0(\varphi\_el)$ and $x\_q, b0(\varphi\_el)$ comprise at least one non-sinusoidal curve, and
wherein the stator-oriented curves of the manipulated variables $x\_a$ and $x\_b$ are calculated from the field-oriented manipulated variables $x\_d$ and $x\_q$ according to the equations $$x\_a = x\_d \cdot x\_d, a0(\varphi\_el) + x\_q \cdot x\_q, a0(\varphi\_el) \text{ and}$$

$$x\_b = x\_d \cdot x\_d, b0(\varphi\_el) + x\_q \cdot x\_q, b0(\varphi\_el).$$

14. The closed-loop control apparatus (1) as claimed in claim 13, wherein the first transformation device (11) is configured to transform at least partly non-sinusoidal curves of the controlled variable in the stator-oriented coordinate system into constant-curve controlled variables in the field-oriented coordinate system.

15. The closed-loop control apparatus (1) as claimed in claim 13, further comprising a memory device configured to save transformation values for one or more transformations between the stator-oriented coordinate system and the field-oriented coordinate system, wherein the first transformation device (11) and/or the second transformation device (13) is configured to carry out the transformation using the saved transformation values.

* * * * *